May 26, 1925.  1,539,177
E. E. GARDHOUSE
GATEWAY
Filed Aug. 30, 1923
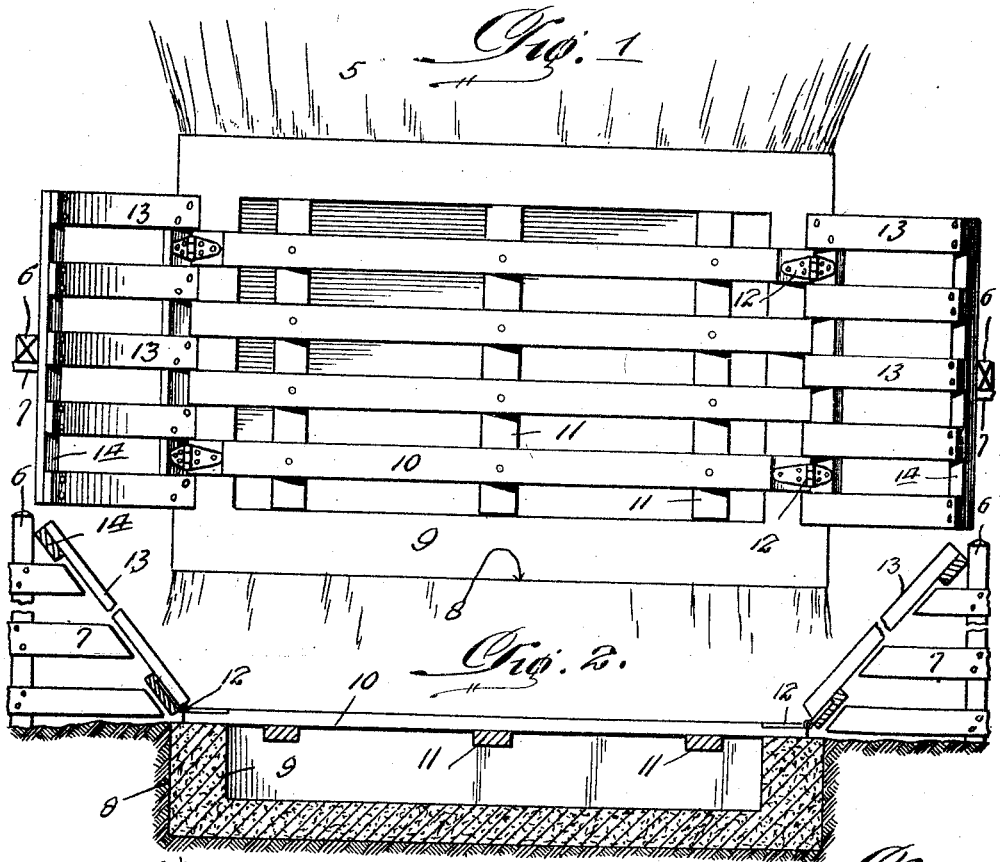
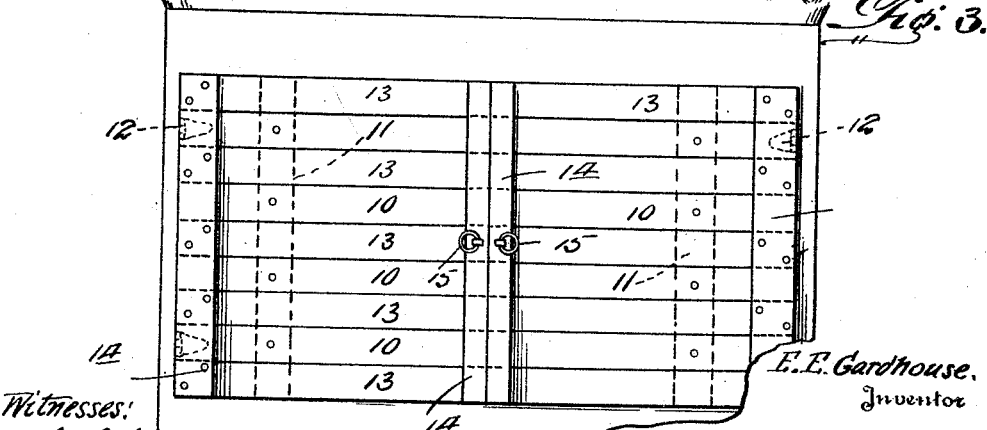
E. E. Gardhouse, Inventor Patented May 26, 1925.

1,539,177

UNITED STATES PATENT OFFICE.

ELMER E. GARDHOUSE, OF PALMYRA, MISSOURI.

GATEWAY.

Application filed August 30, 1923. Serial No. 660,121.

*To all whom it may concern:*

Be it known that I, ELMER E. GARDHOUSE, citizen of the United States, residing at Palmyra, in the county of Marion and State of Missouri, have invented certain new and useful Improvements in Gateways, of which the following is a specification.

This invention relates to certain new and useful improvements in gateways particularly adapted for use in connection with the drive ways of farms or the like, and adapted to permit the free entrance or exit of motor vehicles while effectively guarding against the exit of animals.

An object of the invention is to provide a gateway of the above kind which may be constantly operative without the requirement of opening and closing gates in normal operation, but which embody vertically movable gate members adapted to be manually operated for rendering the gateway in proper condition for the passage of stock or animals thereover.

Another object of the invention is to provide a gateway of the above kind, which embraces the desired qualities of simplicity and durability of construction, as well as the efficiency in operation whereby the same may meet with all of the requirements for a successful commercial use.

Briefly described, the invention contemplates the provision of a pit in the driveway at the entrance to a farm or the like, which pit is provided with a grid in the form of slatted covering or floor, the slats of which are spaced apart sufficiently to guard against the passage of animals thereover, while permitting the passage of motor vehicles thereover without noticeable inconvenience or jar, end gate members being hinged at their lower ends to the sides of the floor for vertical swinging movement, said end gate being of slatted construction with their slats disposed on transverse planes coincident with the spaces between the slats of the floor so that when the end gates are folded downwardly, said spaces will be closed and a solid floor presented for the passage of stock thereover.

Other objects will appear as the nature of the invention is better understood, and the same consists in the novel form, combination and arrangement of parts hereinafter more fully described, shown in the accompanying drawings, and claimed.

In the drawings, wherein like reference characters indicate corresponding parts throughout the several views:

Figure 1 is a top plan view of a gateway constructed in accordance with the present invention with the end gate in open position.

Figure 2 is a transverse sectional view taken substantially centrally of the construction shown in Figure 1, and Figure 3 is a top plan view of the device shown in Figure 1, with the end gate lowered or closed.

Referring more in detail to the drawing, 5 indicates a driveway at the entrance to a farm or the like or at the gateway of the same, suitable fence posts 6 being mounted in an upright position at opposite sides of the gateway and supporting any suitable form of fence construction which preferably includes horizontal runners or slats 7.

In accordance with the present invention, a pit 8 of suitable depth and length is dug in the driveway at the entrance to the farm, and this pit preferably extends from side to side of the driveway as shown. In order to present a durable and neat construction, for the support of the slatted floor to be presently described, this pit is provided with a lining 9 which is shown as constructed of concrete, but which obviously may be formed of wood or metal or other composite construction as found most desirable, the walls of the lining 9 being substantially flush with the surface of the ground as indicated in the drawing. The top of the pit is covered by a slatted floor composed of parallel spaced slats 10 that extend transversely of the gateway and are rigidly mounted upon the pit lining 9 in any suitable or preferred manner, said transverse slats 10 being spaced sufficiently apart to provide an efficient animal or cattle guard for preventing exit of the animals from the farm, while presenting no barrier to the convenient and easy passage of a motor vehicle thereover, the slat being constructed of sufficiently strong and heavy material to withstand the weight of such motor vehicles. The slats 10 are reinforced against downward flexing and rigidly connected in spaced relation by means of a plurality of spaced parallel bars 11 that contact with the under surfaces of the slats 10 and extend longitudinally of the driveway 5, one of said bars 11 preferably being positioned midway between the sides of the pit as shown clearly in Figures 1 and 2 for obvious reinforcement purposes. The connection of the slats with the bars 11 is preferably secured by bolting or the like, and it will be apparent to those skilled in the art, that a construction of this character will preferably prevent the exit of animals from an enclosure or farm due to the natural tendency of an animal's fear of crossing a place or point where insecure footing is presented.

Hinged at their lower ends, as at 12 to the sides of the slatted floor are a pair of vertically swinging side gates composed of a plurality of parallel spaced slots 13 that are rigidly connected at their opposite ends by means of bars 14, the slats extending in a direction parallel with the slats 10 when the gates are swung inwardly and downwardly and being positioned so as to pass between and close the spaces between the slats 10. The fence may be provided with any suitable means for supporting the gate 13 in upwardly diverging relation as shown in Figures 1 and 2, such as by progressively extending the slats or runners of the fence toward the gateway to a greater distance progressively from the upper runner slat 7 to the lower one thereof at each side of the gateway. By permitting the end gate to swing to upwardly diverging relation in this manner, the gateway may be of ordinary width and still provide necessary clearance at the plane of the mud guard usually found upon motor vehicles. The gate 13 may be provided with suitable handles 15 adapted to be grasped in manipulating the same or for raising or lowering them in the use or operation of the device.

In operation, the device is normally positioned as shown in Figures 1 and 2 with the end gate 13 raised or opened and in this position, the exit of animals from the farm or closure is effectively prevented, while a gateway is presented that is constantly open to the entrance or exit of motor vehicles.

However, in the event that it is desired to permit animals to pass from the farm or to enter the same, it is only necessary to swing the gate 13 inwardly and downwardly, so that the slats 12 thereof fill the spaces between the slats 10 of the floor. When this is done, a solid cover is presented for the pit which presents a secure footing for the animals and over which they will readily pass.

An advantage of a construction of the above kind is that considerable time is saved by the use of the same, due to the fact that it is unnecessary for the driver of a motor vehicle to open and close a gate each time he desires to pass in or out when driving a motor vehicle while at the same time efficient means is constantly presented for the safeguard against exit of animals when the latter is undesired, the latter having presenting means for permitting the passage of animals through the gateway when the necessity therefor should arise.

Furthermore the construction is of a simple and practical, as well as durable form, and will not noticeably detract from the neat appearance of the place where installed.

Minor changes may be made without departing from the spirit and scope of the invention as claimed.

What I claim as new is:

1. A gateway for farms or the like comprising a slatted floor adapted to be supported flush with the ground to cover a pit dug in the latter at the entrance of the farm or the like, the slats of said floor being in spaced relation to exclude the passage of animals thereover while permitting the free passage of a motor vehicle thereover, and slatted gates hinged to the sides of said floor and embodying slats adapted to jointly cooperate for closing the spaces between the slats of the floor when said gates are lowered.

2. A combined gateway and animal guard for farm entrances comprising a pit adapted to be embedded in the roadway to extend cross wise of the same at a point between spaced ends of a fence, a grid in the form of a slatted floor adapted to extend over the open top of the pit, the slats of said floor being disposed transversely of the roadway and being spaced longitudinally apart to prevent the passage of animals thereover, and a pair of slatted closures hinged to the opposite end of said floor, the slats of said closure being of a width and so disposed as to permit them to be swung between the spaces existing between the first named slats for presenting an unbroken surface to function as a platform for permitting unimpeded passage of animals thereover.

In testimony whereof I affix my signature.

ELMER E. GARDHOUSE.